Nov. 19, 1957 P. D. JOHNSON 2,813,411
PHOTOFLASH LAMPS
Filed April 30, 1956

Inventor:
Peter D. Johnson,
by Paul A. Frank
His Attorney.

United States Patent Office 2,813,411
Patented Nov. 19, 1957

2,813,411
PHOTOFLASH LAMPS

Peter D. Johnson, Schenectady, N. Y., assignor to General Electric Company, a corporation of New York Application April 30, 1956, Serial No. 581,611

3 Claims. (Cl. 67—31)

The present invention relates to photoflash lamps in general. More particularly, the invention relates to photoflash lamps having increased chemical energy to light conversion efficiency.

Photoflash lamps presently utilized in photographic and allied arts generally are either of the primer type as disclosed and claimed in U. S. Patent 2,291,983—M. Pipkin, or of the wire or foil type as disclosed and claimed in U. S. Patent 2,178,428—E. Lemmers. In the former type photoflash lamps actinic light is produced solely by the burning of a solid combustible mixture coated upon the lamp electrode or filament, while, in the latter type, actinic light is produced primarily by the burning of a combustible material which may be a metallic wire, shredded foil or leaf foil distributed throughout the lamp envelope.

It is a principal object of the present invention to provide photoflash lamps of the aforementioned types having a high efficiency of conversion of chemical energy into actinic light.

Still another object of the invention is to provide primer type photoflash lamps having a high efficiency of conversion of chemical energy into actinic light.

Yet another object of the invention is to provide wire or foil type photoflash lamps having a high efficiency of conversion of chemical energy into actinic light.

Yet another object of the invention is to provide photoflash lamps, the light emission of which is concentrated in the actinic, or photographically useful, spectrum, which may, for the purposes of this specification, be defined as extending from 3500 to 7000 Angstrom units.

Briefly stated, in accord with the invention, I provide improved photoflash lamps having a high concentration of light emission in the actinic spectrum and, consequently, a high efficiency of conversion of chemical energy into actinic light. The foregoing is accomplished by adding to the combustible actinic light producing element of the lamps of the invention certain additives which increase the actinic light emission thereof. This increase in actinic light emission causes a greater amount of actinic light being emitted per unit weight of combustible material, and results in lamps having increased efficiency of conversion of chemical energy into actinic light.

Figure 1:
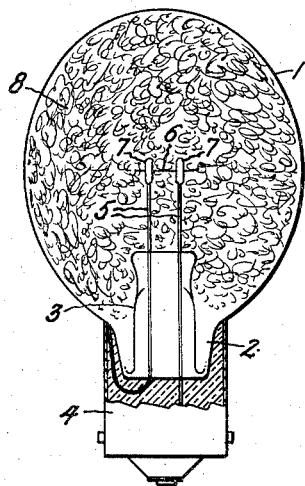
Figure 2:
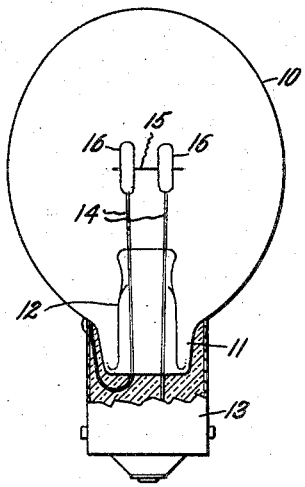

The novel features believed characteristic of the invention are set forth in the appended claims. The invention itself together with further objects and advantages thereof may best be understood by referring to the following description taken in conjunction with the accompanying drawing in which:

Fig. 1 is an elevation view of a photoflash lamp illustrating one embodiment of the invention, and Fig. 2 is an elevation view of a photoflash lamp illustrating another embodiment of the invention.

In Figure 1 of the drawing, the photoflash lamp shown comprises an hermetically sealed envelope or bulb 1 of a suitable light transmitting material such as glass having a neck portion 2 and a solid reentrant portion 3. A suitable base 4 is secured to neck portion 2 as by cementing or other suitable means. Bulb 1 is filled with a combustion supporting gaseous filling which may be oxygen or a suitable oxygenous or oxidizing gas at a pressure of from approximately .2 to 2 atmospheres but preferably approximately 1 atmosphere. Bulb 1 may be coated on its inner or outer surface, preferably on both surfaces, with a coating of a suitable light transmitting lacquer or varnish to minimize cracking of the bulb on flashing and to render the bulb substantially shatter proof.

Sealed into the re-entrant portion 3 of bulb 1 and extending thereinto from the neck portion 2 thereof are a pair of lead-in wires 5. Bridging the interior ends of lead-in wires 5 is a small ignition filament 6 which may comprise a length of wire of a suitable high resistance material such as tungsten. Mounted near the interior ends of lead-in wires 5 and at least partially embedding filament 6 are thin coatings 7 of a suitable primer or combustible material for causing an initial ignition flash within the lamp envelope. The primer material comprising coatings 7 may conveniently comprise a powdered mixture of a readily combustible metal such as zirconium, and an oxygen liberating substance such as potassium chlorate or potassium perchlorate, bonded together by a suitable binder such as nitrocellulose. The interior of envelope 1 is filled with a flocculent metallic mass 8 of combustible actinic light producing material which may, for instance, be in the form of fine wires, shredded foil or leaf foil. Combustible material 8 comprises a major constituent of aluminum, magnesium, or any alloy of magnesium and aluminum with which has been alloyed a minor portion of one or more metals selected from the group consisting of chromium and manganese.

Conventional photoflash bulbs used heretofore are similar to the bulbs of my invention but utilize as the flocculent metallic mass of combustible actinic light producing material, aluminum, magnesium or alloys thereof. While such bulbs have heretofore proved satisfactory in operation, I have found that the addition of chromium or manganese in minor percentages has the effect of increasing the emission of the combustion-produced light emitting substance in the actinic spectrum and greatly increasing the efficiency of conversion of chemical energy into actinic light.

I have found that the actinic light conversion efficiency of photoflash lamps of this type may be greatly increased by alloying from 0.5 to 20% by weight of chromium or manganese with the major constituent. The additive must be added to form an alloy or solid solution so that it is atomically dispersed within the main constituent in order to obtain the advantages of the invention. If less than 0.5% of manganese or chromium is alloyed with the main constituent the addition is insufficient to obtain the desired improvement in the lamps of the invention. If more than 20% of chromium or manganese is alloyed with the main constituent, the mechanical properties of the main constituent are adversely affected. Additionally, less chemical energy is available for conversion into actinic light. While useful increases in actinic light output of the photoflash lamps of the invention may be obtained with additions of the aforementioned metals in the aforementioned percentages, the preferred range is from 4 to 6% by weight. The optimum effect upon the actinic light output of the photoflash lamps of the invention is found in this range. Additionally, although both chromium and manganese, as additives, increase the efficiency of the flashbulbs of the invention, chromium is the most effective. Accordingly, in the preferred embodiment of the invention, 4 to 6% by weight of chromium is alloyed with the main constituent of combustible material 8. When one of the alloys resulting from the above metallic additions is prepared in fine wire or shredded or leaf foil form according to techniques well known to the photoflash lamp art and placed within a photoflash lamp as illustrated in Figure 1 of the drawing, a much superior lamp results. This superiority is due to the fact that a much greater amount of the chemical energy present in the combustible material within the lamp is converted into actinic light than has been possible heretofore in conventional photoflash lamps.

One specific example of this embodiment of the invention, given by way of illustration only and not to be construed in a limiting sense, comprises a lamp as illustrated in Figure 1 of the drawing having an elliptical glass envelope having a major axis of 1⅝" and a minor axis of 1⅜". The bulb is filled with an atmosphere of commercial grade oxygen at a pressure of approximately 0.8 atmosphere. The primer coating on the lead-in wires is approximately ⅛" long and approximately 0.003" thick. The filament is a 0.0007" diameter tungsten wire. Flocculent combustible material 8 comprises approximately 30 milligrams of shredded foil approximately 0.0008" wide and thick and is composed of an alloy of 5% by weight of chromium, the remainder being aluminum.

In Figure 2 of the drawing there is shown an elevation view of a photoflash lamp illustrating another embodiment of the invention. The photoflash lamp of Figure 2 includes a hermetically sealed light transmitting envelope 10 which may conveniently be of glass having a neck portion 11 and a re-entrant portion 12. Envelope 10 is filled with oxygen or a suitable oxygenous or oxidizing gas at a pressure of .2 to 2 atmospheres and preferably approximately one atmosphere. A suitable base 13 is cemented or otherwise fastened to neck portion 11 of envelope 10 and serves as a contact-making member for the lamp. Supported within re-entrant portion 12 of envelope 10 are a pair of lead-in electrodes 14, the interior ends of which are bridged by a small ignition filament 15 which may conveniently be of high resistance alloy or metal such as tungsten. Mounted on the inner ends of lead-in electrodes 14 and at least partially embedding filament 15 are a pair of beads 16 of a combustible mixture which comprises the sole source of actinic light generated by the lamp. Beads 16 are located at the same position as primer coatings 7 of the lamp in Figure 1 of the drawings. The former differ from the latter in the respect that while the latter serve primarily as means to ignite the flocculent means of combustible material disposed throughout the lamp envelope, the former serves as the sole source of actinic light within the lamp. For this reason beads 16 contain a much greater amount, from 10 to 100 times more, of combustible material than the coatings 8 of the lamp illustrated in Fig. 1 of the drawing.

Beads 16 of combustible mixture may conveniently comprise a powdered mixture of an alloy of zirconium or titanium with a minor portion of a material selected from the group consisting of chromium and manganese, together with an oxygen liberating compound which may be potassium or sodium chlorate or potassium or sodium perchlorate or the substantial equivalents thereof. The chromium or manganese alloyed with zirconium, or titanium, may be added in quantities ranging from 0.5 to 20% by weight. As with the first embodiment of the invention, the greatest increase in actinic light is derived from additions of from 4 to 6% by weight of chromium or manganese. Likewise, I prefer to utilize chromium as the additive since a greater increase in actinic light is obtained when chromium is used.

In one specific example of this embodiment of the invention, given for illustrative purposes only, and not intended to be construed in a limiting sense, a lamp is constructed as illustrated in Fig. 2. The lamp bulb is elliptical in shape and has a major axis of 1⅝" and a minor axis of 1⅜". The bulb is filled with commercial grade oxygen at a pressure of approximately 0.8 atmosphere. Filament 15 is a 0.0007" diameter tungsten wire and lead-in wires 14 are 0.010" nickel wires. Beads 16 each weigh approximately 25 milligrams and comprise 40% by weight of potassium perchlorate and 60% of a combustible light producing alloy of 5% by weight of chromium, the remainder being zirconium, bound with a nitrocellulose binder.

I have found that photoflash lamps constructed in accord with this embodiment of the invention emit a greater amount of actinic light and hence have a greatly increased conversion efficiency of chemical energy to visible light.

The photoflash lamps of this invention may be produced in accord with standard manufacturing techniques. The lamps of the first described embodiment of this invention utilizing a wire or foil type actinic light producing combustible material may be produced in accord with the teachings of U. S. Patent 2,351,290—F. J. Rippl et al. Likewise, the bulbs of the second described embodiment of the invention wherein the combustible bead comprises the actinic light producing substance may be produced in accord with the aforementioned U. S. Patent 2,291,983—M. Pipkin.

While I have described the invention with reference to certain embodiments thereof, many modifications will occur to those skilled in the art. I intend therefore by the appended claims to cover all such modifications as come within the true spirit and scope of the invention.

What I claim as new and desire to secure by Letters Patent of the United States is:

1. A photoflash lamp comprising a hermetically sealed light transmitting envelope, an oxygenous atmosphere within said envelope, a pair of lead-in electrodes within said envelope, a high resistance filament bridging said electrodes, and a combustible actinic light producing mixture bonded to the interior ends of said electrodes and adapted to be ignited by said filament, said mixture comprising an oxygen liberating substance and a combustible metallic alloy of a major constituent selected from the group consisting of zirconium and titanium and 0.5% to 20% by weight of a minor constituent selected from the group consisting of chromium and manganese.

2. The photoflash lamp of claim 1 in which the combustible metallic alloy comprises zirconium and 0.5% to 20% by weight of chromium.

3. The photoflash lamp of claim 1 in which the combustible metallic alloy comprises zirconium and 4 to 6% by weight of chromium.

References Cited in the file of this patent

UNITED STATES PATENTS 2,201,294  Kreidler _____ May 21, 1940

FOREIGN PATENTS 503,540  Great Britain _____ Apr. 11, 1939